US005640992A

United States Patent [19]
Huang

[11] Patent Number: 5,640,992
[45] Date of Patent: Jun. 24, 1997

[54] PRESSURE GAUGE CAPABLE OF AUTOMATICALLY STOPPING SUPPLY OF PRESSURE FROM A PRESSURE SOURCE

[76] Inventor: Tien-Tsai Huang, No. 4-2, Lane 30, Wu-Chang St., Pan-Chiao City, Taipei Hsien, Taiwan

[21] Appl. No.: 513,026

[22] Filed: Aug. 9, 1995

[51] Int. Cl.⁶ .................................................. H01H 35/36
[52] U.S. Cl. .................... 137/487.5; 137/557; 200/56 R; 417/44.5
[58] Field of Search ............................... 137/487.5, 557; 200/56 R; 417/44.5

[56] References Cited

U.S. PATENT DOCUMENTS

| 2,159,702 | 5/1939 | Klein et al. | 200/56 R |
| 2,741,987 | 4/1956 | Murphy et al. | 200/56 R |
| 4,906,977 | 3/1990 | Huey-Jeng | 137/557 X |
| 5,286,931 | 2/1994 | Murphy et al. | 200/56 R |
| 5,289,161 | 2/1994 | Huang | 340/447 |

*Primary Examiner*—Stephen M. Hepperle
*Attorney, Agent, or Firm*—Oblon, Spivak, McClelland, Maier & Neustadt, P.C.

[57] ABSTRACT

A pressure gauge includes a housing, a Bourdon tube with a closed end, an adjustment rod mounted rotatably in the housing, a microswitch installed on the adjustment rod, a gear, a sector wheel meshing with the gear, and a crank member interconnecting the sector wheel and the closed end of the Bourdon. Increase of the air pressure inside the Bourdon tube activates a portion of the assembly of the Bourdon tube and the sector wheel to contact the microswitch, so as to stop supply of compressed air from a pressure source to an article which is measured by the gauge. The adjustment rod can be rotated relative to the housing so as to change the distance between the microswitch and the portion of the assembly, thereby adjusting the preset upper limit value of the air pressure inside the Bourdon tube.

5 Claims, 5 Drawing Sheets

5,640,992

PRESSURE GAUGE CAPABLE OF AUTOMATICALLY STOPPING SUPPLY OF PRESSURE FROM A PRESSURE SOURCE

BACKGROUND OF THE INVENTION

This invention relates to a pressure gauge with a Bourdon tube, more particularly to a pressure gauge which can automatically stop supply of compressed air from a pressure source into an article when the air pressure of the article exceeds a preset value.

The improvement of this invention is directed to the conventional pressure gauge shown in FIGS. 1 and 2. As illustrated, the conventional pressure gauge 10 includes an air chamber 11, a pressure-value indicating panel 12, an adjustment knob 13, a driving lever 14 secured to the adjustment knob 13 so as to rotate synchronously therewith, a driven lever 15 with a fixed upper post 151, a pressure-value indicating pointer 16 for displaying the pressure of the chamber 11, a stop post 17 fastened to and located under the driven lever 15, and a power controlling switch 18 fixed on the panel 12. By rotating the adjustment knob 13 relative to the panel 12, the driving lever 14 impels the driven lever 15 to rotate clockwise to a predetermined position in the gauge 10 which corresponds to a preset upper limit value of air pressure. In a situation where compressed air is supplied from a pressure source into an article whose pressure value is being measured by the gauge 10, when the air pressure of the air chamber 11 exceeds the preset upper limit value, the pointer 16 rotates in the gauge 10 to a position where the pointer 16 contacts the stop post 17 so as to activate the switch 18 to stop the supply of the compressed air from the pressure source into the article. The conventional pressure gauge 10 suffers from the following disadvantages:

(1) The pressure gauge 10 needs a bulky housing to accommodate a large number of parts therein, thereby limiting the applicability of the gauge 10 in industry.
(2) To reduce the preset upper limit pressure value, it is necessary to first pull the adjustment knob 13 upward so as to ascend the driving lever 14 to a level above the upper end of the upper post 151. Then, the adjustment knob 13 is rotated clockwise until the driving lever 14 passes beyond the upper post 151 so that the driving lever 14 can be descended. At this time, the adjustment knob 14 can be rotated counterclockwise to impel the driven lever 15. This adjustment process is time-consuming and troublesome for the user.
(3) Because the adjustment to the preset pressure value is achieved by the operations of the parts 13, 15, 16, 18, when any one of the parts 13, 15, 16, 18 is broken or curved, the gauge 10 may malfunction or cannot display accurately the pressure value of the air chamber 11.

SUMMARY OF THE INVENTION

An object of this invention is to provide a compact pressure gauge which can automatically stop supply of compressed air from a pressure source into an article to be measured and in which the upper limit pressure value can be easily adjusted.

According to this invention, a pressure gauge includes a housing, a Bourdon tube with a closed end, an adjustment rod mounted rotatably in the housing, a microswitch installed on the adjustment rod, a gear, a sector wheel meshing with the gear, and a crank member interconnecting the sector wheel and the closed end of the Bourdon. Increase of the air pressure inside the Bourdon tube activates a portion of the assembly of the Bourdon tube and the sector wheel to contact the microswitch, so as to stop supply of compressed air from a pressure source to an article which is measured by the gauge. The adjustment rod can be rotated relative to the housing so as to change the distance between the microswitch and the portion of the assembly, thereby adjusting the preset upper limit value of the air pressure inside the Bourdon tube.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
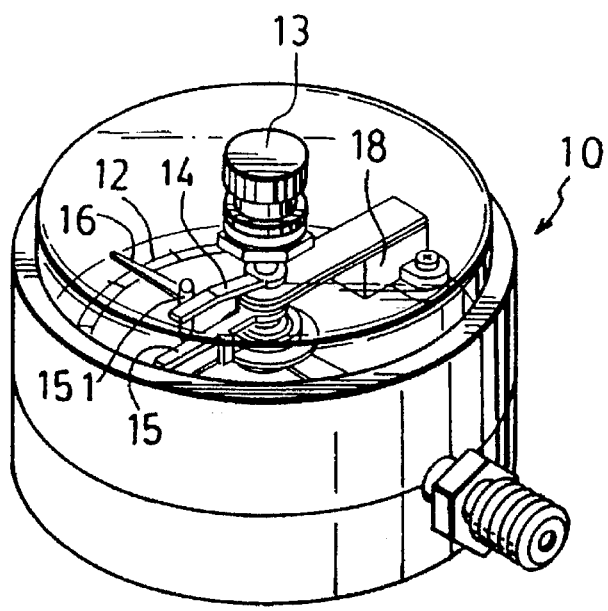
FIG. 1 is a perspective view of a conventional pressure gauge.
Figure 2:
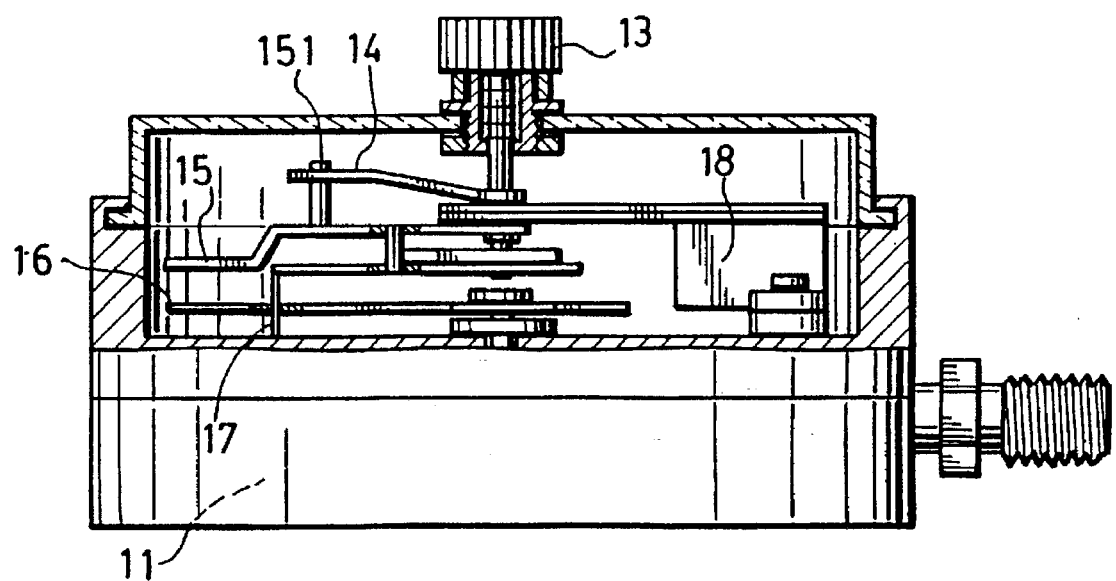
FIG. 2 is a sectional view of the conventional pressure gauge.
Figure 3:
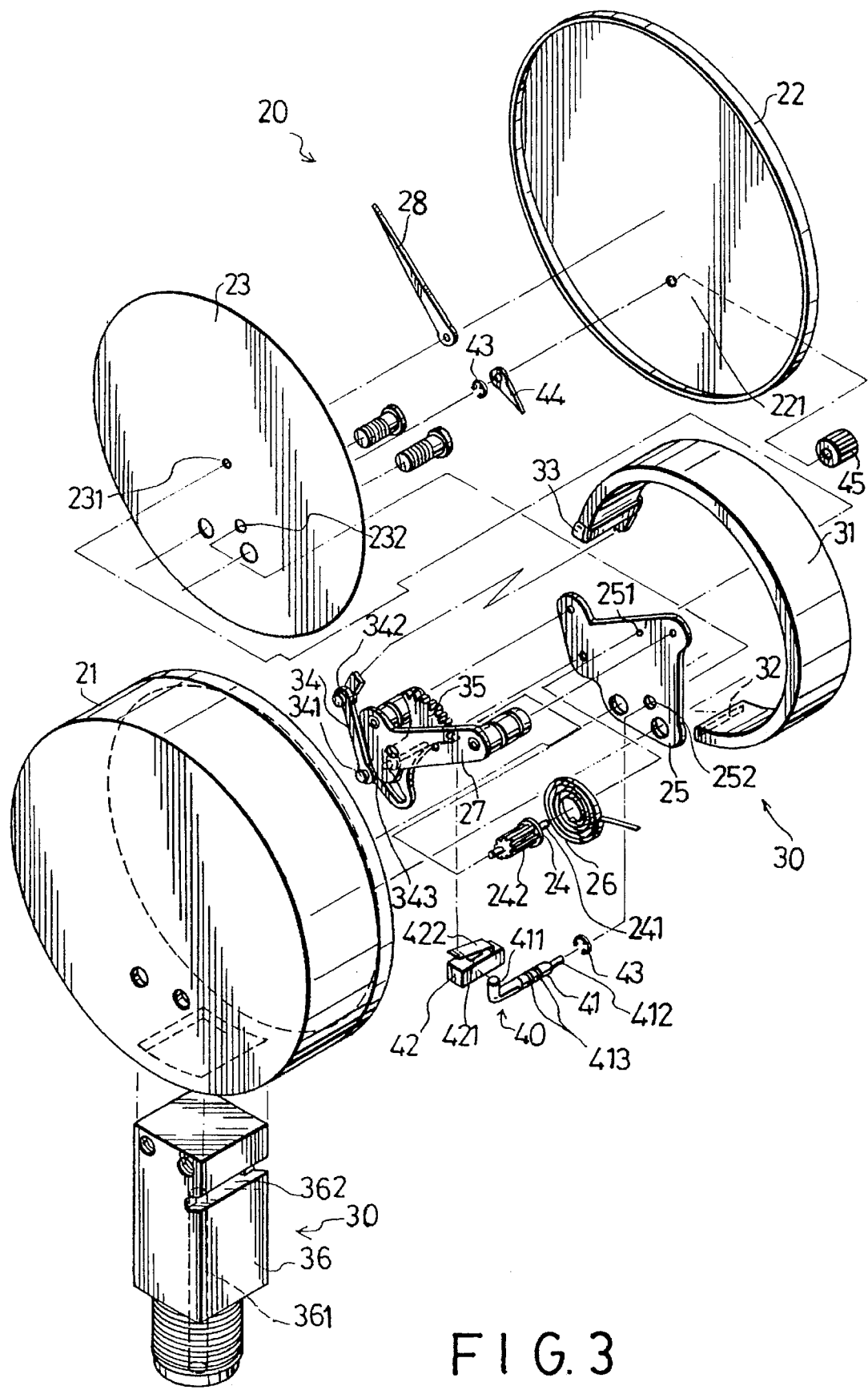
FIG. 3 is an exploded view of a pressure gauge according to a first embodiment of this invention.
Figure 4:
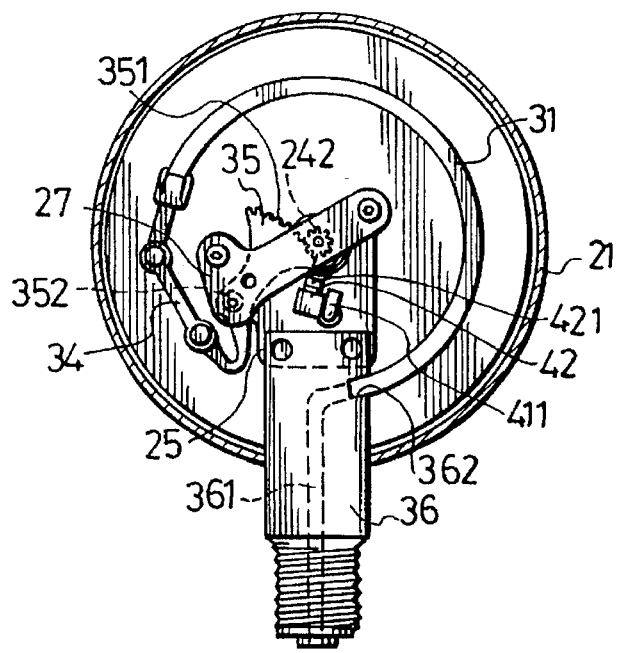
FIGS. 4 and 5 are schematic views illustrating the operation of the pressure gauge according to the first embodiment of this invention.

Referring to FIGS. 3 and 4, a pressure gauge of this invention includes a gauge body assembly 20, a detecting assembly 30 with a Bourdon tube 31, and an adjusting assembly 40. The Bourdon tube 31 has an open end 32 and a closed end 33.

The gauge body assembly 20 includes a hollow housing 21, a transparent cover 22, a pressure-value indicating panel 23, a gear 24 having a fixed pivot pin 241 and a splined section 242, a first positioning plate 25, a spiral spring 26, and a second positioning plate 27. The first and second positioning plates 25, 27 are secured in the housing 21. The pivot pin 241 of the gear 24 extends through the pin hole 251 of the first positioning plate 25 and the pin hole 231 of the panel 23. A pressure-value indicating needle 28 is sleeved tightly on the pivot pin 241 of the gear 24 so as to display the air pressure inside the Bourdon tube 31. The spiral spring 26 is connected to the gear 24 so as to zero the gauge.

The detecting assembly 30 further includes a crank member 34, a sector wheel 35 having a toothed first end portion 351 (see FIG. 4) and a second end portion 352, and a connector 36 which is fastened to the housing 21 and which is formed with an entrance passage 361 and an open-ended slot 362 communicated fluidly with the entrance passage 361. The open end 32 of the Bourdon tube 31 is press fitted within the slot 362 of the connector 36, in such a manner that the interior of the Bourdon tube 31 is communicated fluidly with the entrance passage 361. The crank member 34 is mounted pivotally on the second positioning plate 27 by a pivot 341 and has a first crank arm 342 connected pivotally to the closed end 33 of the Bourdon tube 31, and a second crank arm 343 connected pivotally to the second end portion 352 of the sector wheel 35.

The adjusting assembly 40 includes an adjustment rod 41 extending through the rod hole 252 of the first positioning plate 25 and having an L-shaped end 411, a reduced-diameter end 412 extending through the rod hole 232 of the panel 23 and the hole 221 of the cover 22, and two annular grooves 413 on which two C-shaped retaining rings 43 are respectively sleeved and which are located on two sides of the first positioning plate 25 so as to position the adjustment rod 41 relative to the first positioning plate 25 while permitting rotation of the adjustment rod 41 on the first positioning plate 25. The sector wheel 35 and the adjustment rod 41 have rotating axes which are parallel with each other. A preset-pressure pointer 44 is sleeved tightly on the second end 412 of the adjustment rod 41 so as to indicate the preset upper limit value of the air pressure inside the Bourdon tube 31. A rotary knob 45 is sleeved tightly on the distal end of the second end 412 of the adjustment rod 41 so as to fix the cover 22 on the housing 21. A fastening member 42 is adhered to the L-shaped end 411 of the adjustment rod 41 and carries a microswitch 421 thereon, which is connected electrically to a pressure source. A reed spring 422 is secured to the fastening member 42 and covers the microswitch 421.

Figure 5:
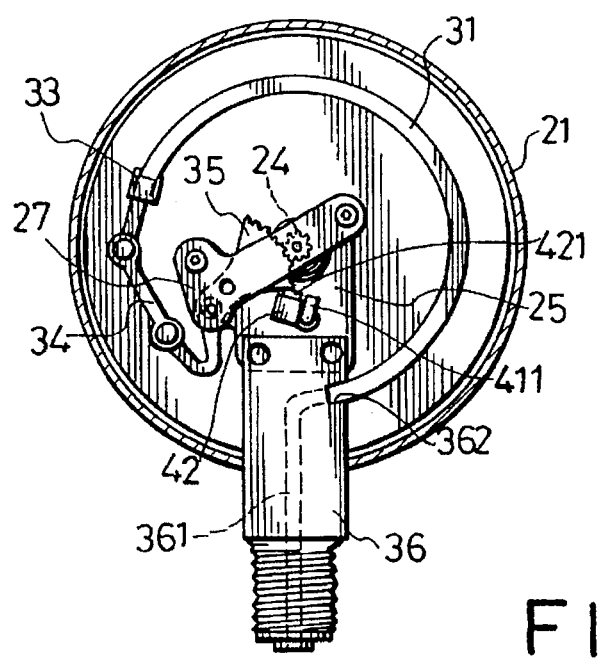

Referring to FIG. 5, in use, when supplied from the pressure source to an article which is being measured by the gauge of this invention, compressed air enters into the Bourdon tube 31 via the entrance passage 361 of the connector 36. The closed end 33 of the Bourdon tube 31 rotates the crank member 34 counterclockwise so as to rotate the sector wheel 35 clockwise, thereby rotating the gear 24 and the needle 28 (see FIG. 3) counterclockwise in the housing 21. When the air pressure inside the Bourdon tube 31 exceeds the preset upper limit value, the microswitch 421 stops supply of compressed air from the pressure source to the article. Actuation of the rotary knob 45 (see FIG. 3) on the cover 22 (see FIG. 3) can rotate the microswitch 421 about the adjustment rod 41 (see FIG. 3) so as to vary distance between the microswitch 421 and the toothed first end portion 351, thus adjusting the preset upper limit value of the air pressure inside the Bourdon tube 31.

Figure 6:
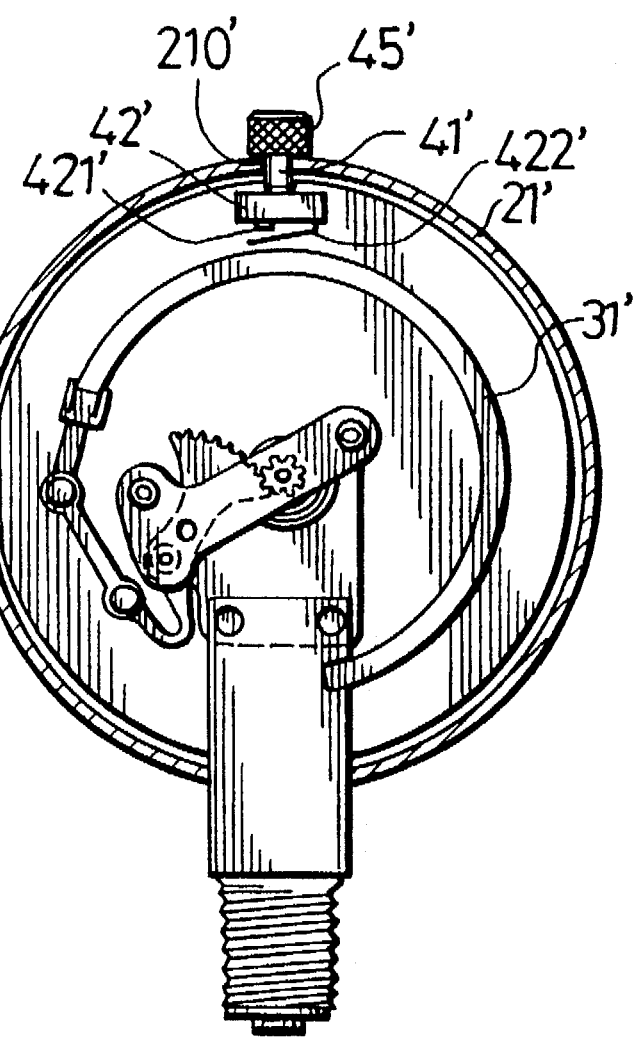
FIG. 6 shows a pressure gauge according to a second embodiment of this invention.

The adjustment assembly may be modified into the construction of FIG. 6, which includes an adjustment rod 41' having an externally threaded portion that extends through and is engaged threadably within a threaded hole 210' of the housing 21'. A fastening member 42' is carried on the inner end of the adjustment rod 41' and is provided with a microswitch 421' and a spring reed 422'. In use, increase of the air pressure inside the Bourdon tube 31' moves an intermediate portion of the Bourdon tube 31' toward the microswitch 421'. A rotary knob 45' is secured to the outer end of the adjustment rod 41' and can be actuated to rotate the adjustment rod 41' on the housing 21' so as to move the microswitch 421' toward or away from the intermediate portion of the Bourdon tube 31', thereby determining the preset upper limit value of the air pressure inside the Bourdon tube 31'. When the air pressure inside the Bourdon tube 31' exceeds the preset upper limit value, the intermediate portion of the Bourdon tube 31' contacts and activates the microswitch 421' so as to stop supply of compressed air from an associated pressure source to a measured article.

Figure 7:
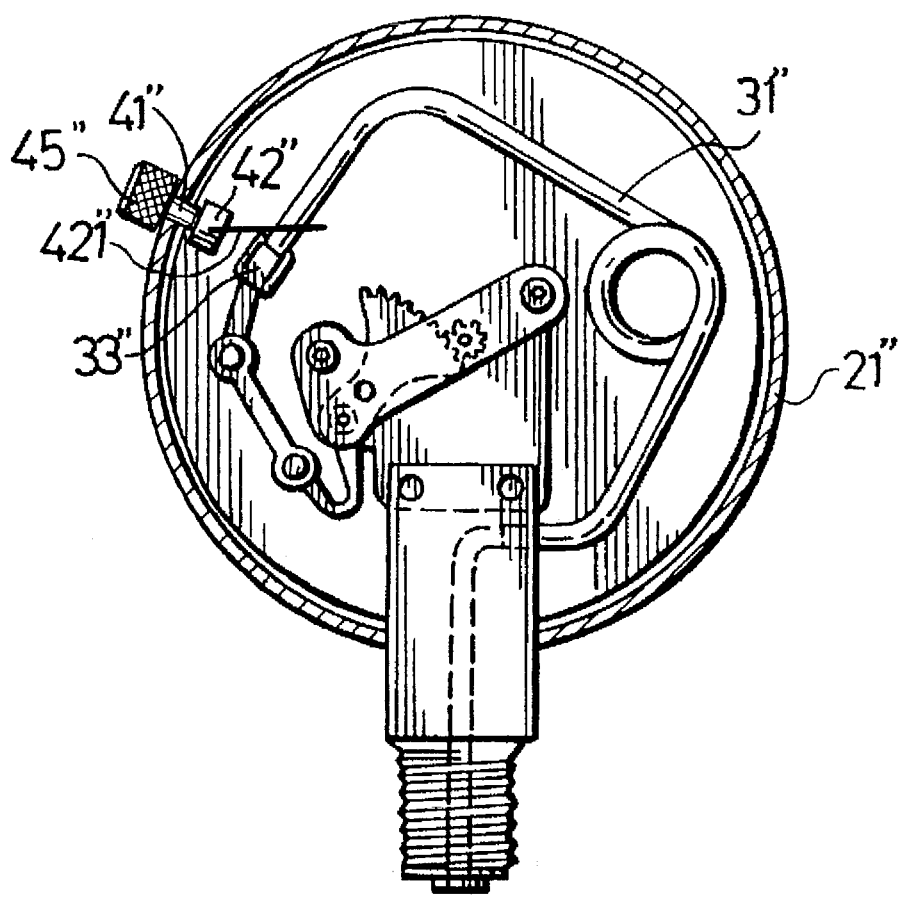
FIG. 7 shows a pressure gauge according to a third embodiment of this invention.

FIG. 7 shows another embodiment of this invention. Unlike the embodiment of FIG. 6, the assembly of the adjustment rod 41", the fastening member 42" and the microswitch 421" are moved to a position on the housing 21" which is adjacent to the closed end 33" of the Bourdon tube 31". The microswitch 421" and the Bourdon tube 31" are different from those of the previous embodiment in construction. Increase of the air pressure inside the Bourdon tube 31" moves the closed end 33" of the Bourdon tube 31" toward the microswitch 421". When the air pressure inside the Bourdon tube 31" exceeds a preset upper limit value, the microswitch 421" stops supply of compressed air from an associated pressure source to a measured article. The rotary knob 45" can be actuated so as to vary distance between the closed end 33" of the Bourdon tube 31" and the microswitch 421", thereby adjusting the preset upper limit value of the air pressure inside the Bourdon tube 31".

With this invention thus explained, it is apparent that numerous modifications and variations can be made without departing from the scope and spirit of this invention. It is therefore intended that this invention be limited only as indicated in the appended claims.

I claim:

1. A pressure gauge adapted to measure air pressure in an article and comprising:

a housing having an entrance passage which is communicated fluidly with an exterior of said housing, said housing being capable of being coupled with said article in such a manner that an interior of said article is communicated fluidly with said entrance passage;

an adjustment rod mounted rotatably on said housing;

a Bourdon tube having a closed end and an open end which is communicated fluidly with said entrance passage;

a microswitch carried on said adjustment rod and adapted to be connected electrically to a pressure source which supplies compressed air into said article, said microswitch being capable of being activated so as to stop supply of compressed air from said pressure source into said article, position of said microswitch in said housing determining a preset upper limit value of air pressure inside said Bourdon tube;

a gear journalled in said housing;

a sector wheel mounted rotatably in said housing and meshing with said gear;

a crank member interconnecting said sector wheel and said closed end of said Bourdon tube in such a manner that, increase of pressure inside said Bourdon tube activates said crank member so as to rotate said sector wheel in said housing, thereby engaging a portion of assembly of said Bourdon tube and said sector wheel with said microswitch, said adjustment rod being rotatable relative to said housing so as to change distance between said microswitch and the portion of the assembly of said Bourdon tube and said sector wheel, thereby adjusting the preset upper limit value of air pressure inside said Bourdon tube;

a pressure-value indicating needle mounted rotatably in said housing; and a spring biasing said pressure-value indicating needle to rotate to a predetermined position in which said gauge is zeroed.

2. A pressure gauge as claimed in claim 1, wherein said crank member is mounted pivotally in said housing and has a first crank arm connected pivotally to said closed end of said Bourdon tube and a second crank arm, said sector wheel being elongated and having a toothed first end portion, a second end portion connected pivotally to said second crank arm of said crank member, and an intermediate portion positioned between said first and second end portions and mounted pivotally in said housing.

3. A pressure gauge as claimed in claim 2, wherein the portion of the assembly of said crank member and said sector wheel is said toothed first end portion of said sector wheel, said sector wheel and said adjustment rod having rotating axes which are parallel with each other, said microswitch being attached to a side of said adjustment rod in such a manner that said microswitch can rotate about said adjustment rod during rotation of said adjustment rod relative to said housing.

4. A pressure gauge as claimed in claim 1, wherein said housing has a peripheral wall with a threaded hole formed therethrough, said adjustment rod having an externally threaded portion which extends through and is engaged threadably within said threaded hole of said housing, said microswitch being installed on said adjustment rod and positioned between said adjustment rod and an intermediate portion of said Bourdon tube, said adjustment rod being rotatable relative to said housing to move said microswitch in said housing so as to change distance between said microswitch and said intermediate portion of said Bourdon tube, increase of air pressure inside said Bourdon tube moving said intermediate portion of said Bourdon tube toward said microswitch.

5. A pressure gauge as claimed in claim 1, wherein said housing has a peripheral wall with a threaded hole formed therethrough, said adjustment rod having an externally threaded portion which extends through and is engaged threadably within said threaded hole of said housing, said microswitch being installed on said adjustment rod and positioned between said adjustment rod and said closed end of said Bourdon tube, said adjustment rod being rotatable relative to said housing to move said microswitch in said housing so as to change distance between said microswitch and said closed end of said Bourdon tube, increase of air pressure inside said Bourdon tube moving said closed end of said Bourdon tube toward said microswitch.

\* \* \* \* \*